(12) United States Patent
Davis et al.

(10) Patent No.: US 8,805,835 B2
(45) Date of Patent: Aug. 12, 2014

(54) SYSTEMS AND METHODS FOR INTEGRATED MANAGEMENT OF LARGE DATA SETS

(71) Applicants: Don W. Davis, Bainbridge Island, WA (US); Michael P. Gerlek, Eagle, ID (US)

(72) Inventors: Don W. Davis, Bainbridge Island, WA (US); Michael P. Gerlek, Eagle, ID (US)

(73) Assignee: Clipcard Inc., Seattle, WA (US)

( * ) Notice: Subject to any disclaimer, the term of this patent is extended or adjusted under 35 U.S.C. 154(b) by 0 days.

(21) Appl. No.: 13/830,104

(22) Filed: Mar. 14, 2013

(65) Prior Publication Data

US 2014/0181130 A1    Jun. 26, 2014

Related U.S. Application Data

(60) Provisional application No. 61/740,373, filed on Dec. 20, 2012.

(51) Int. Cl.
*G06F 17/30* (2006.01)

(52) U.S. Cl.
CPC .............................. *G06F 17/30386* (2013.01)
USPC ......................................... 707/736; 707/804

(58) Field of Classification Search
CPC ................. G06F 17/30014; G06F 17/30241
USPC ......................................... 707/803, 804, 736
See application file for complete search history.

(56) References Cited

U.S. PATENT DOCUMENTS

| 7,743,009 B2* | 6/2010 | Hangartner et al. | 706/46 |
| 2008/0256482 A1* | 10/2008 | Lee et al. | 715/781 |
| 2009/0112812 A1* | 4/2009 | Ellis et al. | 707/3 |
| 2012/0213416 A1* | 8/2012 | Lorimer et al. | 382/113 |
| 2013/0117692 A1* | 5/2013 | Padmanabhan et al. | 715/753 |
| 2013/0191749 A1* | 7/2013 | Coburn et al. | 715/716 |

OTHER PUBLICATIONS

Zeb, 3 Incredible Benefits of Using APIs, Feb. 6, 2012, pp. 1-2.*
IEEE 100 The Authoritative Dictionary of IEEE Standards Terms, 7th Edition, 2000, p. 410.*
International search report and written opinion dated Jan. 16, 2014 for PCT/US2013/075811, 9 pages.

* cited by examiner

*Primary Examiner* — Albert Phillips, III
(74) *Attorney, Agent, or Firm* — Wilson Sonsini Goodrich & Rosati

(57) ABSTRACT

Systems, methods and techniques for managing data sets are described. In particular, systems and methods for modeling, representing, acquiring and disseminating large data sets and data files using metadata are described. The large data sets may include geospatial information. The metadata may be extracted from the data or provided separately. Such metadata may be used to represent the underlying data so as to avoid unnecessary and/or unwanted transfer, exposure or manipulation of the underlying data. The metadata may be represented in a static or dynamic fashion, and may be shared via, for example, social media networks and the like.

30 Claims, 11 Drawing Sheets

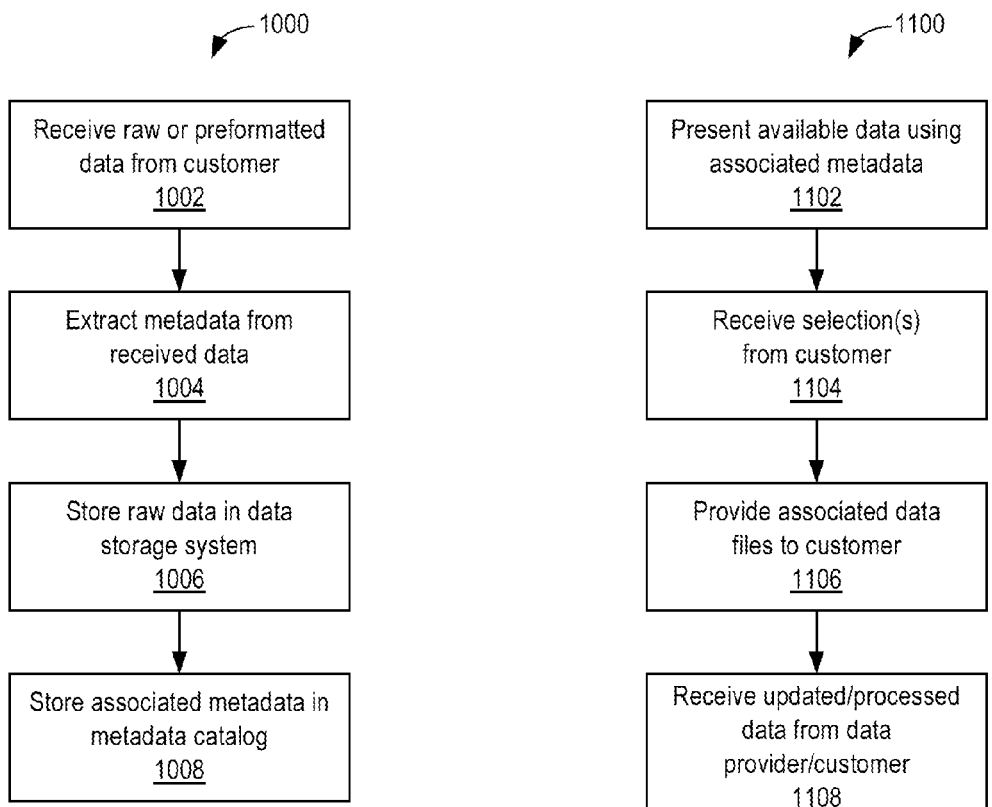

SYSTEMS AND METHODS FOR INTEGRATED MANAGEMENT OF LARGE DATA SETS

CROSS-REFERENCE

This application claims the benefit of U.S. Provisional Application No. 61/740,373, filed Dec. 20, 2012, which application is incorporated herein by reference.

BACKGROUND OF THE INVENTION

As geographic information systems (GIS) and associated technologies such as geospatial analysis increase in scope and complexity, the amount of data used therewith (and generated therefrom) grows at an astounding rate. The proportion of information-sensing devices and methodologies generating computer-readable geospatial data continues to increase, as does the general connectivity of such devices and methodologies. As a result, the amount and complexity of data representing a given geographic concept also tends to increase over time, thus accelerating the overall growth in the size and complexity of data sets across diverse applications, including GIS applications. However, the ability to process "big data," as such ponderously large and complex data sets are commonly known, is often limited by both time and computing resource constraints. These collective limitations constitute the fundamental problem underlying big data, and are particularly relevant to continuing innovation in GIS.

Methodologies for mitigating such constraints are in continuous development. For example, network-connected distributed computing systems, known as cloud computing systems, provide scalable, massively parallelized and aggregated compute resources, such as databases, disk storage, processing capability, and the like. Cloud computing systems provide, e.g., geospatial data providers access to considerably greater computing resources than they might otherwise be able to privately procure and/or administer, thus providing for the use, storage and manipulation of big data associated therewith to a far greater population of users with limited local resources.

However, cloud computing is, by its nature, a "brute force" solution for dealing with the sheer scale of big data. Other logistical issues, such as the length of time involved in getting the data into and out of a cloud computing system in the first instance, generally remain, and become increasingly important as emerging technologies and collaboration models (such as social networks, crowdsourcing and the like) enable greater numbers of, e.g., non-institutional users to participate in the creation, management and dissemination of the concepts underlying the data (as well as the data itself). Additionally, as the scope of geospatial data generation grows broader over time, the number of disparate data formats and types between data sets, and at times within a given data set, increases.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 10 shows an illustrative example of a process for receiving and cataloging data in accordance with at least one embodiment;

FIG. 11 shows an illustrative example of a process for updating and providing availability to data represented by metadata in accordance with at least one embodiment;

DETAILED DESCRIPTION OF THE INVENTION

Figure 1:
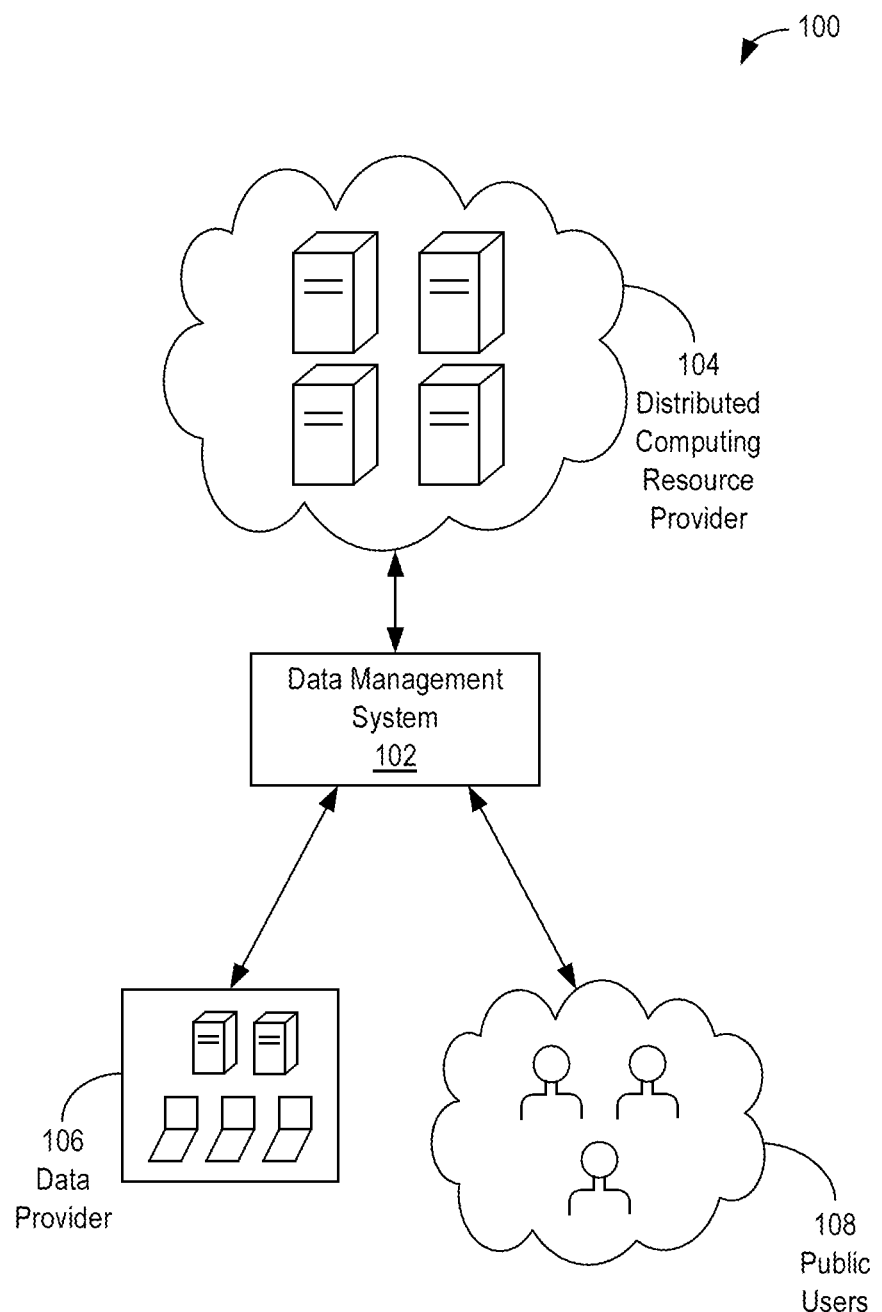
FIG. 1 shows an illustrative example of an environment in which a distributed data management system may be implemented in accordance with at least one embodiment.

Techniques described, suggested and implied herein include systems and methods for storing, accessing, sharing and otherwise managing geospatial or other types of data files using a data management system. For purposes of this application, the terms "geospatial" and "geographic" are used interchangeably. In some embodiments, a data management system may employ metadata extraction and/or data modeling schemes to complex or very large data files (or sets or supersets of data files) so as to ease the handling, processing and dissemination of the data. The term "metadata," as used herein, refers to any data or content derived or derivable from other data or content, including both structural metadata and descriptive metadata. Examples include data or content regarding the means of creation, intended purpose, origin, location (in any sense, including relative, absolute, topological, virtual or geographical), and/or structure of other data or content. The data management system may be implemented as a layer between a geospatial data provider (or other type of data provider) and a distributed computing service provider, and by using one or more metadata extraction and/or data modeling schemes, provide the data provider with an efficient, compact representation of its geospatial or other data holdings, as well as pass through the well-known advantages of storing data via a distributed computing service, such as scalability, economy, ubiquity of access, reliability and the like. Such techniques may also include one or more facilities for streamlining the processing of a data provider's data holdings by decreasing the local resources necessary to do so. The data management system may expose user account functionality to data providers in order to, for example, control access to the data by employees, clients or others. The term "data provider" refers to any entity that provides data, including, but not limited to, servers, systems, users, data creators or the like, as well as any constituents related thereto (e.g., users of such systems and/or employees of such data creators).

In another example described herein, metadata derived, stored and/or acquired by the data management system may be employed as the basis of presentation, dissemination, marketing, and similar activities related to the underlying data. For example, metadata set(s) derived from geospatial data may be visually represented, e.g., on a map and/or in an aggregated format for a given extent, such that users may differentiate and/or select from the associated geospatial data set(s) based on the visual representation of the metadata. As another example, visually represented metadata may be shared between users, e.g., via social networks, email and the like, so that the associated data set(s) themselves need not be moved or transferred. Thus, the sharing of metadata set(s) may, in some embodiments, be agnostic and independent of changes to the underlying data set(s). Any combination of elements within such metadata set(s) may, in some embodiments, be visually represented, with different combinations or subcombinations shown depending on context, user preference, etc. The metadata set(s), and/or the visual representation thereof, may be augmented or supplanted by third parties. For example, one or more visual representation(s) of the metadata set(s) may include facilities whereby third parties, such as data providers, may directly provide, to augment the visual representation, additional content relevant to the data being represented. Additionally, the actions associated with sharing metadata set(s) via, e.g. social networks, email and the like, may be tracked by the data management system so as to internally develop a network representing relationships between users.

FIG. 1 illustrates an example environment 100 in which a data management system 102 may be implemented. The data management system acts, in some embodiments, as an intermediary or "front end" for one or more distributed computing resources of a distributed computing resource provider 104, and are connected in any suitable manner. Where network connections are explicitly or implicitly used, such network connections may be of any suitable type, such as via a clear Internet connection, a virtual private network (VPN), wireless network, local area network (LAN), wide area network (WAN), proprietary network connection, and/or the like. The distributed computing resource provider implements, in some embodiments, a plurality of computing resources, such as data stores, processors, storage devices, memory and the like, as well an abstraction layer that allows, e.g., virtualized and/or machine instances (e.g., those that have direct hardware access, including bare metal and/or other hardware instances) to run independently of the underlying computing resources. Such resource-independent instances are herein referred to as "virtual machines," though the term contemplates not only virtual instances, but also machine instances. The data management system may be implemented as a separate entity from that of the distributed computing resource(s) or provider, or, in some embodiments, some or all components of the data management system may be implemented by the distributed computing resource provider as or upon, e.g., virtual machines exposed therefrom. In some embodiments, some or all components of the data management system may be implemented by one or more data provider(s) 106, and in some embodiments, the data management system may be implemented across any combination of the distributed computing system(s), data provider(s), and entities and/or standalone entities and/or hardware.

The one or more data provider(s) 106 are, in some embodiments, providers of raw and/or preprocessed geospatial data, and may be connected to the data management system 102 in any suitable fashion. In embodiments where the data management system is dispersed or implemented as, e.g., a virtual instance provided by the distributed computing resource provider 104, the data provider may connect directly to the distributed computing resource provider in any suitable manner. Thus, it is contemplated that the concepts described herein, including those associated with the data management system, may be conceptual, rather than physical. Data providers may, in some embodiments, also provide metadata associated with the data, either inherent to the data, or as separate metadata sets. While the techniques disclosed herein are described as applied to geospatial data, it is contemplated that in some embodiments, the data management system 102 is capable of accepting and/or manipulating data of any kind, and is not necessarily limited to geospatial or similar applications. The disclosed technique(s) may be applied in/for any data type, abstraction, application, size, complexity or the like to improve data archival and retrieval for applications where the nature of the utilized data presents difficulties in data representation, data mobility, or other considerations described herein. Examples of such applications include, but are not limited to, those found in the pharmaceutical, bioinformatics, life and physical sciences (including biosciences), medical devices, information technology/science, and/or data archival industries. The flexibility of application of the disclosed techniques is, in some embodiments, enabled at least in part due to modular nature of the systems, methods and frameworks described herein, including techniques described in more detail below that allow third parties to at least partially provide or augment the representations (e.g., metadata representations) of their data with relevant content of their choosing (metadata, metadata derived from metadata, or otherwise).

Upon receiving or otherwise associating with data from the data provider(s) 106, the data management system 102 performs one or more functions upon or related to the data, including metadata extraction, data modeling, forwarding or mirroring of the data for storage on one or more resources of the distributed computing resource provider, processing or reprocessing (e.g., from raw data into a standard file format or between file formats), representing the data in a way that is conducive to end-user consumption, and the like. Exemplary functions, including but not limited to the functions just mentioned, will be described in more detail herein.

One or more users 108 may, in some embodiments, be associated with data provider(s) 106 and access data provided therefrom via the data management system 102. Again, in some embodiments, the public users may be connected to one or both of the data provider(s) and/or the data management system (and/or the distributed computing resource provider as applicable) in any appropriate manner. Such users may, for example, be employees of the data provider(s), or in some embodiments, may be public users that have been authorized, by techniques disclosed herein, by the data provider(s) to access data provided in connection therewith. Some or all of the users may have access to the data and/or metadata via one or more functions of the data management system. In some embodiments, such access may be controlled via one or more functions of the data management system, by, for example, an administrator or other entity associated with the data provider.

Figure 2:
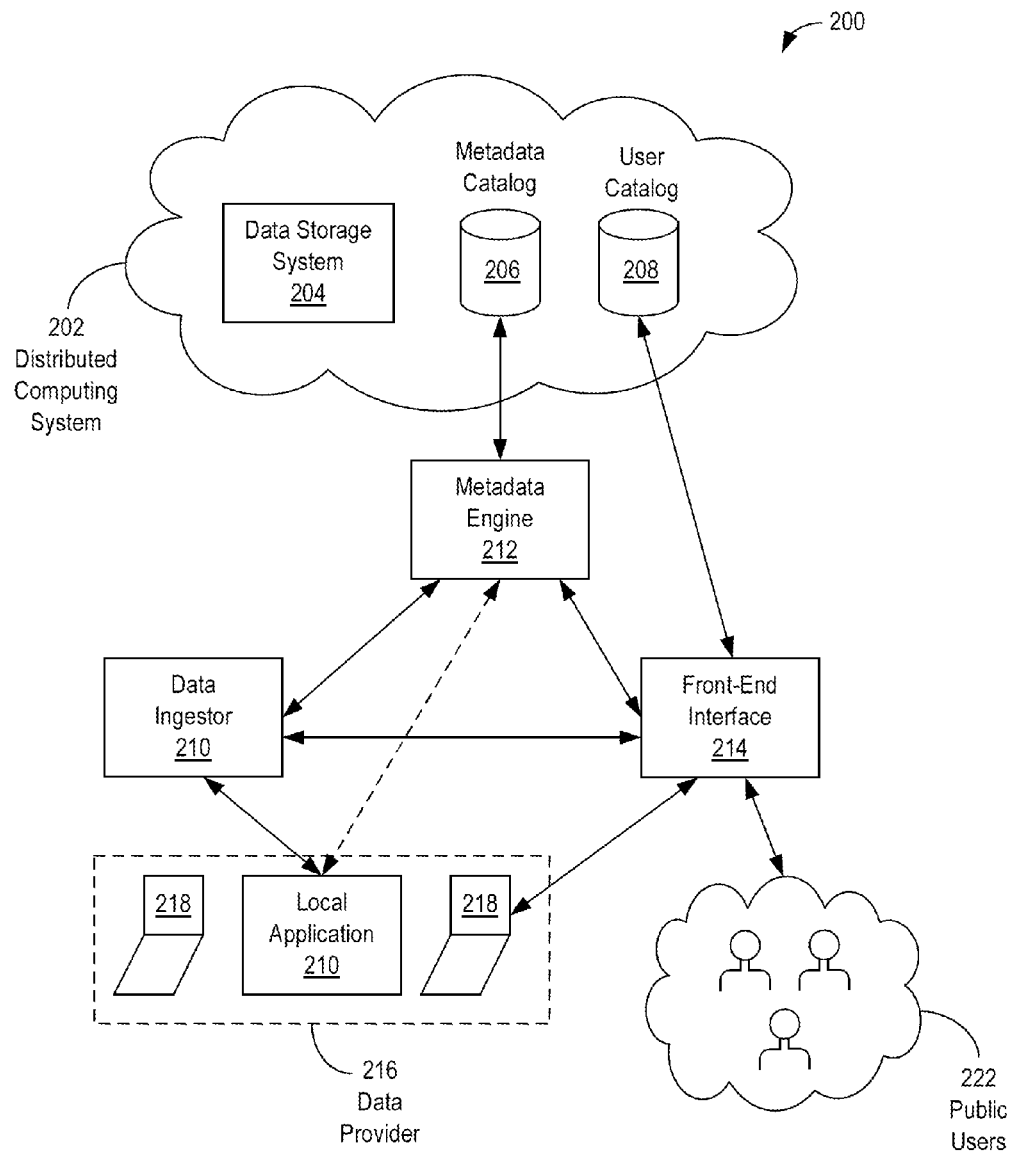
FIG. 2 shows an illustrative example of a distributed data management system in accordance with at least one embodiment.

FIG. 2 illustrates an example topology 200 for a data management system in which the techniques described herein may be applied. As with other examples provided herein, any component described in connection with FIG. 2 may be implemented as physical entities, conceptual entities, or some combination of the two. For example, any number of components or constructs may be combined in any fashion so as to integrate some or all functionality within a given component or construct without deviating from the spirit or scope of the invention disclosed herein. A distributed computing system 202, similar in some embodiments to the distributed computing system provider 104 described in connection with FIG. 1, includes one or more externalized computing resources 204, 206, 208, at least some of which may be virtual machines similar to those described in connection with FIG. 1. Such externalized computing resources may, for example, be accessed through an application programming interface (API), web service or similar protocol provided by the distributed computing system. In some embodiments and as illustrated, the externalized computing resources include a data storage system 204, a metadata catalog 206 and a user catalog 208. The externalized computing resources may be implemented in any appropriate fashion and in any configuration. For example, the metadata catalog and user catalog may in some embodiments be implemented using distributed key-value stores, relational databases or some combination thereof, while the data storage system may be a hardware disk-based storage system or cold storage (archival) system. In some embodiments, the externalized computing resources are made available by the distributed computing system through web services interfaces such as Representation State Transfer (REST) or Simple Object Access Protocol (SOAP).

In some embodiments, a data ingestor 210 interfaces with a metadata engine 212 and a front-end interface 214 to form a data management layer between one or more data providers 216 and the distributed computing system 202 (including the externalized computing resources 204, 206, 208). The data ingestor may, in some embodiments, provide initial direction of data entering the data management system from, e.g., a data provider. For example, one or more workstations 218 of the data provider may have a local application 220 installed thereupon. The local application may track one or more file folders or directories on the workstation(s) and upon detecting a new data file placed in the tracked directory, initiate a "push" of the new data to the data ingestor. In some embodiments, users of the workstation may manually initiate a data upload via the application. Upon receiving the uploaded data, or in some embodiments in parallel with an ongoing upload, the data ingestor may then initiate an asynchronous task to be executed by the metadata engine, wherein the uploaded data is analyzed for relevant metadata, which is then extracted and stored within the metadata catalog and associated with (e.g., "linked" to) the uploaded data. In some embodiments, the data ingestor itself may provide an initial metadata extraction pass to discern sufficient data to create an entry in the metadata catalog for the file, in parallel or asynchronously with a more extensive extraction performed by the metadata engine. In some embodiments, the data ingestor initiates, asynchronously with the metadata extraction task, a storage task such that the uploaded file is stored upon the data storage system for future retrieval upon request. It is contemplated that other methods for uploading data may be made available to the data provider, such as through facilities exposed through the front-end interface. In some embodiments, data may be manually uploaded through the data ingestor by, e.g., administrators of the data management system, for example when physical media (such as hard disk drives) containing extremely large data files are physically provided to the data management system administrators by the data provider (e.g., in cases where the sensitivity, size or complexity of the data desired to be uploaded is not conducive to upload via an Internet or other network link). In some embodiments, the upload may be effected through an API or web service exposed to, e.g., data providers. In some embodiments, the data ingestor, as with other components of the data management system, may be implemented by, integrated with and/or co-located with the data provider. In some embodiments, the upload may be effectuated via the front-end interface, as will be described in more detail below.

The metadata engine 212 is, in some embodiments, responsible for extracting, associating and storing metadata associated with data entering the system via, e.g., the data ingestor 210. As previously described, an initial determination of essential metadata, such as upload date/time, user name associated with the upload, and/or file name, may be made so as to create, e.g., a database entry for the data file. Also as previously described, such actions may be taken by the data ingestor, or in some embodiments, all metadata-related functionality may be performed by a dedicated metadata engine. In some embodiments, the metadata engine and/or metadata-related functionality may be integrated into the operations of the data provider (e.g., metadata engine components or functionality may be collocated with the data provider), or implemented separately and/or remotely from the data provider (e.g., using the externalized computing resources previously described, upon which some or all of the data management system is implemented). The metadata engine may then extract differing amounts of metadata depending on the nature of the data file(s) or data set(s). For example, if the metadata engine is configured to target or prefer specific types of geospatial data formats, it may be able to extract a greater breadth or depth of metadata for incoming data of the targeted or preferred types. In some embodiments, the file type specific metadata may be required by, or relevant to, a standard. One example of such a standard in the geospatial context is ISO 19115, which defines a "best practice" for metadata collection and retention for geospatial data. File formats compliant with the ISO 19115 standard may include metadata required by ISO 19115; in some embodiments, the metadata engine is configured to detect when such standards-compliant file formats are uploaded so as to accurately extract and model the additional or required metadata. In some embodiments, the metadata engine may be configurable to generate a different overall model or schema for each of a plurality of data formats. In some embodiments, extracted metadata may be tiered or hierarchical for multiple abstraction levels of data. For example, the metadata engine may be configured to extract a given set of metadata associated with data sets or groups of files, as well as configured to extract a different set of metadata associated with each file. The term "data set(s)," as used herein, refers to one or more sets (e.g., agglomerations, associations or compilations) of data elements or files. Such associations may be based on predetermined relationships between the constituent data elements or files (e.g., in the case of geospatial data, the association between files may be created by the metadata engine based on their geographic proximity, thereby creating a data set of such associated data elements or files), or may be arbitrarily chosen by, e.g., the data provider or system user, with or without regard to any relationship between the data elements or files. Such associations may be automatically created by one or more aspects of the data management system (such as the metadata engine), suggested by one or more aspects of the data management system for selection by a data provider or user (e.g., through a user interface or API, such as that described in more detail below), or defined by, e.g., a data provider or user of the data management system through a user interface, API, or the like. Such associations may be made prior to, in connection with, or at any time after the upload of the subject data, regardless of whether metadata has yet been extracted from the data. In embodiments where associations into data sets have already been made, the metadata engine may generate and/or extract new metadata if such associations are dissolved and new associations created. As may be contemplated, the metadata generated and/or extracted may, in some embodiments, differ in scope or content depending on whether the data requested to be processed by the metadata engine constitutes a single data element or file, multiple unassociated data elements or files, or data set(s) as described herein. In the geospatial context, a broad data set may have metadata relevant to the entire data set, such as minimum and maximum resolution of the data within the data set, target geographical feature, price, and the like. The file-level metadata may, by contrast, include more specific information, such as bibliographic information or internal file and upload information. Some types of metadata may be utilized for a plurality of levels, such as preview images of the represented data ("thumbnails"), digital object identifiers (DOIs), and/or data provenance information (e.g., file history, ownership, prior processing steps and states of the data, and the like). In some embodiments, hierarchically organized metadata may inherit certain elements from its parent(s) and/or include context information, e.g., positioning within the hierarchy, related information and/or metadata nodes, and the like. In some embodiments, the metadata engine may generate metadata from or related to other metadata (i.e., metadata-derived metadata). It is contemplated that each entity associated with the data management system described herein (including, for example, data providers/sources, geographic locales, users, accounts and the like) may be conceptualized as a data object with associated metadata, and such metadata may, in some embodiments, be utilized as a basis for facilitating the organization of data by way of associations between the metadata associated with the data. One non-limiting example may include a data provider with associated metadata identifying the data provider. In this example, data uploaded by the data provider may have metadata associated therewith that also identifies the data provider as the source. Similarly, data sets created by the data provider using such data may also have metadata associated therewith that identifies the data provider as the source. In such a scenario, each construct—the data provider, the data sets, and the data itself—may be interlinked within the data management system, with the data provider being identifiable as the "top level" source. In embodiments where each of such constructs is treated as a fungible data object, the "top level" source—here, the data provider object—may be represented as, for example, an electronic metadata information card as described in more detail below, or in any other appropriate representation. Such interlinking and/or association between objects may occur at the time of data and/or metadata ingestion, some time thereafter as a synchronous or asynchronous process, or upon the issuance of some trigger, such as a search initiated by a user (for example, the user searching for all holdings sourced from a given data provider.) The agglomeration of such data into hierarchically organized constructs may additionally enable the use of higher level agglomerations, such as a data provider "card," as a way to represent, manipulate, market or otherwise utilize some or all objects associated therewith (e.g., hierarchically at or below such an agglomeration).

The metadata engine 212 may, in some embodiments, provide ways in which metadata associated with data may be imported, augmented, edited and/or exported outside of, and/or in addition to, the extraction techniques described above. For example, in some embodiments, certain file types containing raw or unformatted data may contain little or no extractable metadata. As another example, the metadata contained in the data file may be incorrect or corrupted. Alternatively or in addition, a data provider may wish to augment metadata existing with the data file (e.g., with comments, copyright notices, and the like). Any activities related to the metadata information, including ingestion, updation, augmentation, association, authentication or consistency thereof, and/or the like, may, in some embodiments, initiate confirmation or other feedback upon commission, initiation or completion of such activities, using various techniques described or implied herein, as well as any appropriate technique known in the art. Such confirmation or other feedback may be generated, relayed or otherwise handled using any component described herein and appropriate thereto, including the metadata engine itself. The metadata engine may, in some embodiments, support the importation of extrinsic metadata information via upload of a separate file containing such extrinsic information, such as through the data ingestor 210 previously described. In some embodiments, extrinsic information may be defined through the front-end interface 214, such as in conjunction with a data upload. In some of such embodiments, metadata information, as well as attendant files containing only such metadata information, may be uploaded and processed by the system without any association to a data file or data set stored or to be stored on the system. In these embodiments, a link or other identifier identifying the location of an associated data file residing outside of the extant data management system (e.g., residing with a third party system) may be stored in the metadata catalog. In some embodiments, metadata without associations to a data files or data sets may be uploaded, but instead may be associated with (or point to) other types of content. Examples of such content may include links to data provider websites, contact phone numbers, or external or internal documents (e.g., frequently asked questions (FAQ) pages or other types of reference documents) that describe the availability, source or provenance of potentially available data or data sets. Such additional content may be exposed using any appropriate technique, including using an electronic metadata information card described in more detail herein. It is contemplated that such content may, in some embodiments, be replaceable with the actual data or data sets at a time, at which time one or more associations between the metadata and the data/data set(s) is updated. Some or all of the metadata associated with data files, including augmented and extracted metadata, may be editable via, e.g., the front-end interface 214, or in some embodiments, via an API or web service. Similarly, some or all of the metadata associated with one or more data files, or one or more data sets, may be packaged as a metadata file by, e.g., the metadata engine, and in some embodiments, provided for download upon request through an API, web service and/or the front-end interface. A metadata file created and downloaded in such a manner may, in some embodiments, be idempotent if used as an input file of extrinsic information for the data from whence it derived.

As the utility and/or effectiveness of many of the concepts and techniques described herein may be heavily dependent on the accuracy of the represented metadata information, one or more techniques to verify and/or correct user- and/or data provider-provided metadata may be employed. In some embodiments, metadata associated with new uploaded data may manually verified, e.g., by direct communication between an employee of the data provider and an administrator of the data management system. In some embodiments, an automated verification process may be employed. For example, if certain metadata is blank or corrupt, the data provider may be appropriately notified to enter or correct the metadata (e.g., by uploading a file containing new extrinsic metadata information, or by entering such data within a UI). Heuristics may also be employed to, e.g., ensure consistency and continuity of metadata information between disparate but related files and/or within a given file. Any data store, catalog or other component handling, storing or transacting metadata information may, in some embodiments, be capable of securing the metadata (and the associated data) secure from, e.g., malicious attacks, misappropriation, and the like, using any appropriate technique known in the art.

Upon population of metadata information within the metadata catalog 206 and association with data stored in data storage system 204, a data provider 216 or employee thereof, and/or one or more public users 222 (which may, in some embodiments, be similar to the users 108 described in connection with FIG. 1) may view all or a subset of the data stored within the data storage system. In some embodiments, the metadata associated with the data is presented so as to inform a potential user, processor, administrator or other potential downloader of the data of the contents thereof. In exemplary embodiments, the metadata representative of the data allows, e.g., a data provider employee to select, based on the metadata, only the specific data needed for a given workflow (e.g., processing of raw data files). Such selection, and subsequent download, may be facilitated by the application 220, which may or may not be the same or similar application as the one exemplarily utilized for uploading or "pushing" and described above. As illustrated, in some embodiments the application may query the metadata engine, or possibly directly query the metadata catalog, for the metadata and its data association(s). In some embodiments, similar facilities for representing data using associated metadata, as well as subsequent selection and/or downloading of data, e.g., by data providers, may be provided through the front-end interface, as will be discussed in more detail below.

In some embodiments, a front-end interface 214 provides an externally facing interface for displaying, uploading, downloading, transacting and otherwise manipulating data and metadata managed and/or stored by the data management system. Such a front-end interface may be utilized by data provider(s) 216 and/or public users 222. The front-end interface may be implemented in any appropriate manner and using any appropriate number or type of components. For example, the front-end interface may include a Web server programmed to provide a visual UI via the Internet. In some embodiments, the front-end interface may expose one or more APIs to various components described herein, and as previously described. In some embodiments, the front-end interface may utilize the data ingestor for upload, download, and manipulation of various data files. Similarly, the front-end interface may utilize the metadata engine to read, write, replace, modify, remove, export and/or import metadata information, including information regarding association with, e.g., data stored within the data storage system. In some embodiments, the front-end interface may directly transact, alternatively or additionally, with the externalized computing resources, such as the data storage system, the metadata catalog, and/or the user catalog, using any appropriate technique familiar to those of ordinary skill in the art. It is contemplated that the front-end interface, or any other component of the data management system capable of external communication, may expose metadata information to external data handlers, such as search engine indexers ("spiders"), to, e.g., aid dissemination of the information. For example, exposing metadata information to spiders allows for the aggregation and display of the exposed metadata in associated search engine result pages.

In some embodiments, the front-end interface, or any other component of the data management system capable of external communication, may enable external entities to query, search, view, transact with or manipulate, via the metadata associated therewith or accessible thereto, data managed or otherwise associated with the various components of the data management system. In some embodiments, the front-end interface may offer to external entities access to such metadata (and data) via API(s), UIs, or in any other appropriate manner. In some embodiments, the front-end interface enables monetization of such access by, e.g., requiring payment for general access to the data management system or data/metadata associated therewith, per specific search query, per access request (e.g. "pay per click"), or any other appropriate manner of monetization. In some embodiments, the visibility of such metadata and/or data to external entities may be increased and/or otherwise optimized based on, e.g., relevance to the initiating query, cost, or any other appropriate parameter or combination of parameters. In some embodiments, visibility of data and/or metadata to external entities may be monetizable by, for example, enabling sources of the data and/or metadata (or entities thereto, such as data providers) to pay for better visibility (e.g., higher search positioning) on an appropriate basis (e.g., "pay per click"). Other examples include provisions, enabled by the front-end interface, for displaying sponsored links in exchange for monetary considerations from the data provider(s), where such sponsored link directs an external entity to, for example, an electronic metadata information card associated with the paying data provider(s) and displaying some or all of the data associated therewith, or any other destination specified by the data provider(s).

Access control of, e.g., public users or data provider employees may be administered and defined through the front-end interface, such as via a UI, API or web service. Such users may be created through a function of the front-end interface, including via one or more UIs, APIs or web services, or may be implicitly or explicitly created by one or more actions of existing users. In an exemplary embodiment, various rights levels may be defined by an administrator of the data managements system, a designated administrator of/for the data provider(s), or both. Such rights levels, which control varying permissions across the data management system (including upload/download rights, visibility of data holdings, user creation/administration, and the like), may be freely assigned by, e.g., the administrators as just described, to various user accounts, either individually or in groups. In some embodiments, the individual permissions may be grouped into user "roles," which may be assigned to users and/or groups of users in accordance with their intended capacity. For example, a data processing employee of the data provider may be granted permission to download a subset of the data provider's holdings and upload post-processed data to replace the existing data, but may not be allowed to view data holdings beyond those s/he is permitted to manipulate, nor is allowed to upload new data files. The user account information, which includes biographical and/or other relevant profile information, authentication information such as passwords and/or tokens, associated rights and/or permissions, and association with various data and/or data providers, are, in some embodiments, stored in the user catalog. Such user account entries in the catalog may be utilized by, e.g., the front-end interface, to provide a differing user experience depending on the authorized user, such as only displaying portions of a UI pertinent to actions for which the user has rights and/or permissions. It is contemplated that in some embodiments, the concept of a user is unitary, in that the only differentiation between, e.g., public users and data provider employee users, is the set, subset or superset of rights and/or permissions granted thereto.

An exemplary front-end interface using Web pages is shown and described in connection with FIGS. 3 through 9 below.

Figure 3:
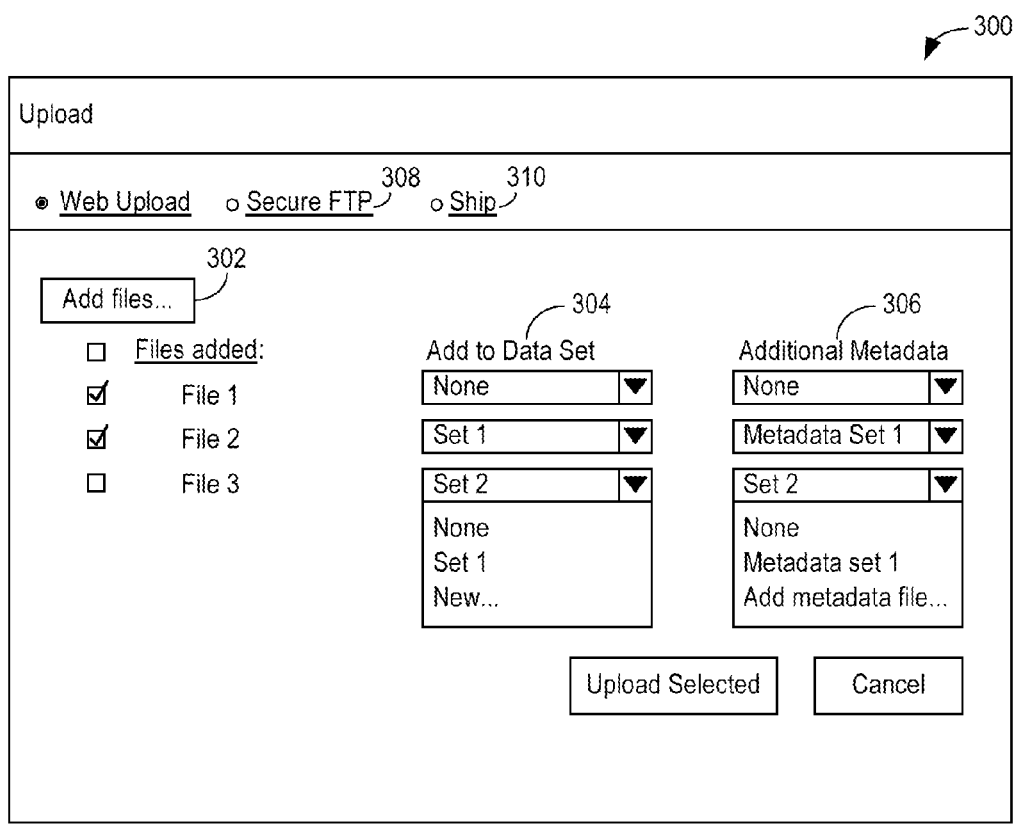
FIG. 3 shows an illustrative example of a user interface (UI) for uploading data into and/or via a distributed data management system in accordance with at least one embodiment.

FIG. 3 illustrates an exemplary file upload UI 300 for uploading data files. As previously alluded to in connection with at least FIG. 2, the file upload UI may facilitate the upload from, e.g., a data provider (such as the data provider(s) 106, 216) or employee/user thereof. Also as previously described, a user with appropriate rights/permissions, such as an employee of data provider 216 (for example, using a workstation 218 with or without the benefit of a local application 220), may use the file upload UI to add data for uploading, create data sets from previously uploaded or not yet uploaded data (and associate data therewith) 304, create, upload and/or associate metadata 306, or any combination thereof. In some embodiments, the upload UI may provide guidance or intake for alternate data upload options, such as direct file transfer protocol (FTP)-based submission 308, or notifying the data management system administrator of an intent to ship physical media containing data to be uploaded 310.

Figure 4:
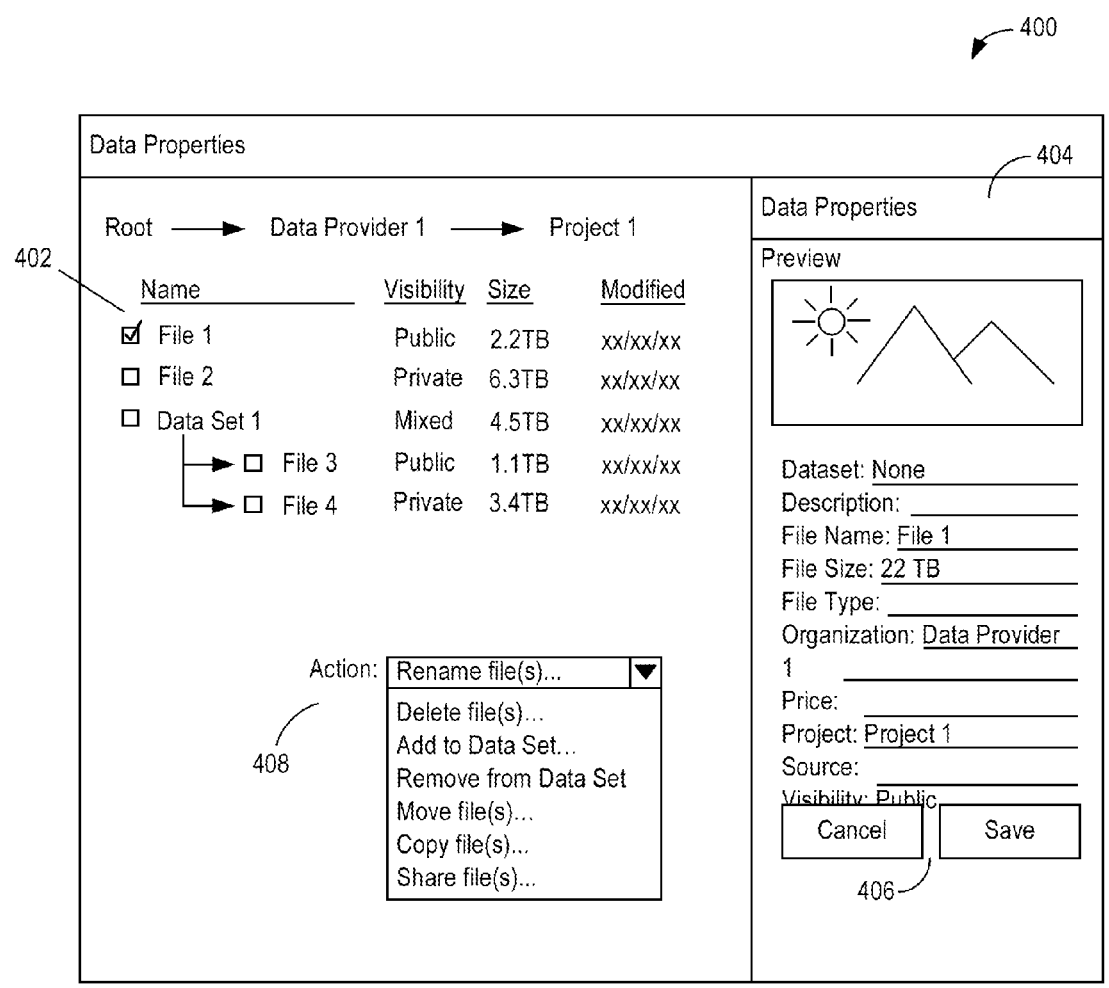
FIG. 4 shows an illustrative example of a UI for representing data holdings managed by a distributed data management system in accordance with at least one embodiment.

FIG. 4 illustrates an exemplary file view UI 400 for viewing files to which an authorized user has rights/permissions to access. Files represented may, in exemplary embodiments, include some or all data holdings 402 of a data provider that have been uploaded and/or modeled (e.g., having had metadata extracted from or associated with) using one or more of the techniques discussed herein. In the illustrated exemplary embodiment, some of the relevant metadata information for the file or files currently selected may be displayed 404, if such metadata information is available. In some embodiments, functionality for updating at least a subset of the associated metadata 406 is provided. In some embodiments, additional functions, such as downloading, renaming, deleting, moving, associating, reassociating and/or disassociating data with data set(s), copying and sharing (e.g., via social networks, email and the like) may be available 408. The actions, file(s) and/or metadata displayed and/or made available through the file view UI may, in some embodiments, be determined based on the permissions/rights of the presently authorized user.

Figure 5:
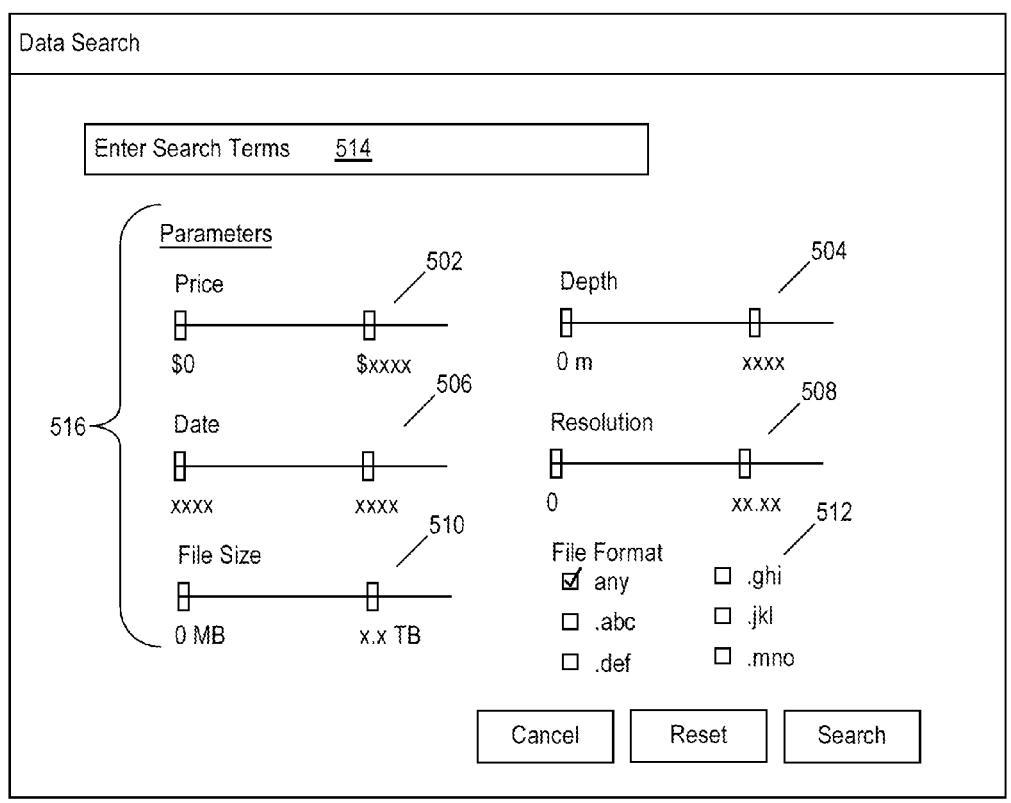
FIG. 5 shows an illustrative example of a UI for visually representing and searching for geospatial data in accordance with at least one embodiment.

FIG. 5 illustrates an exemplary visual data search UI 500 for map-based searching of data. The data search UI enables, in some embodiments, users (including public users) to search against data managed by the data management system. Such data may have been uploaded, and metadata associated therewith, according to techniques described herein. The illustrated example exposes predefined search criteria including price 502, depth range 504, resolution range 506, date of capture 508, file size 510 and file format 512, as well as a freeform search input 514. Some or all of the predefined criteria 516 may map to specific metadata associated with some or all of the data against which a search query is run, while the freeform search input may allow users to search against a wider subset of metadata (such as data provider-provided comments, data provider names and the like). In an exemplary embodiment, the bounds of the predefined (or freeform) search criteria may be derived from the metadata itself. For example, the front-end interface or similar construct may constrain the available and/or definable price range, based on inspection of the relevant metadata associated with, e.g., data within the current map view. The illustrated example also provides an option to limit the search within the current map view, or alternatively to perform a global search without regard to the currently displayed map view. Upon formation and submission of the search query, in some embodiments, the UI submits a query to the metadata engine or metadata catalog (e.g., the metadata engine 212 and/or the metadata catalog 206 described in connection with FIG. 2) to determine, without necessitating operations against the associated stored data sets (e.g., files), which files comply with the search request.

Figure 6:
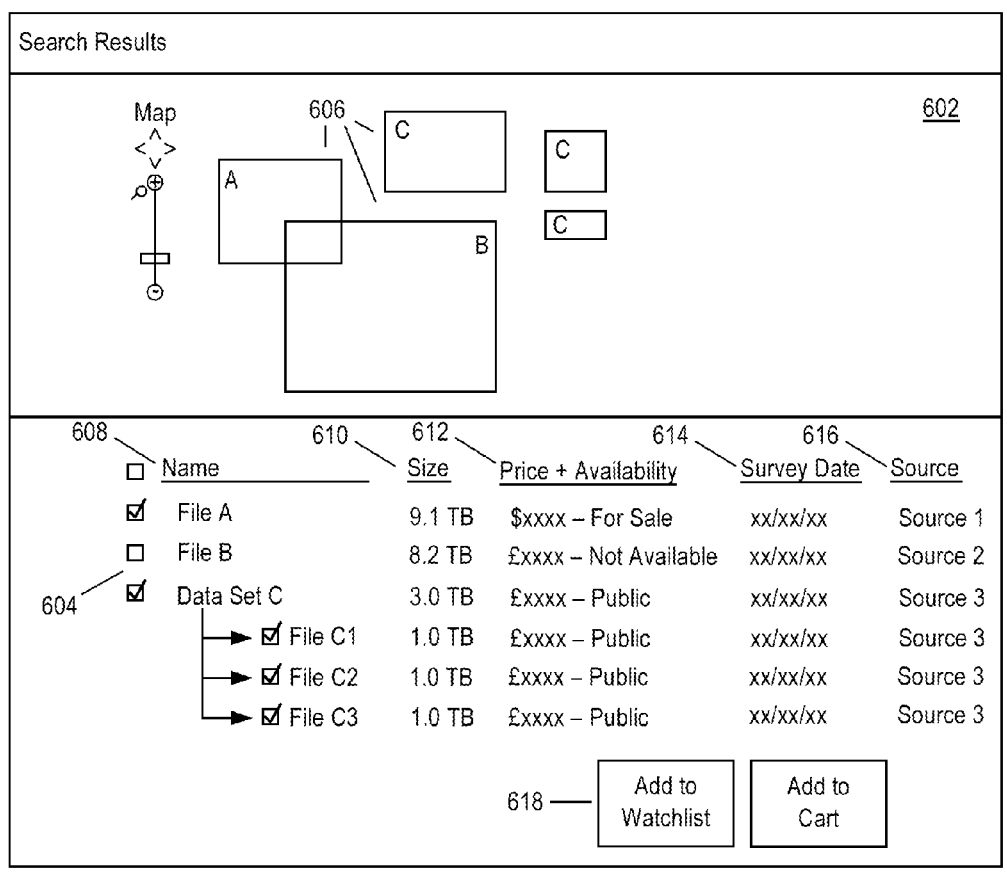
FIG. 6 shows an illustrative example of a UI for displaying results associated with a search for geospatial data in accordance with at least one embodiment.

FIG. 6 illustrates an exemplary visual search result UI 600 for displaying results from, e.g., submission of a search query as described in connection with FIG. 5. In the illustrated embodiment, after the search is performed, the results thereof appear in connection with a map. The map 602 may visually represent the geospatial extent of each result. In addition, a list of the matching files or data sets may be presented 604, along with information relevant therewith. As illustrated, each file or data set displayed in the list may be associated with the visual representation of the geospatial extent 606 as displayed on the map (e.g., "file A" associated with visually represented extent A, etc.). In some embodiments, color-coding or other methods of visual association of the visual representations of geospatial extents may be used to emphasize or display differentiation between metadata information associated therewith. For example, represented data or data sets may be associated with metadata indicating whether the underlying data is public, private or offered for sale, and the aforementioned color-coding may be employed to visually differentiate between such characteristics. Certain information, which may in some embodiments be derived from metadata previously associated with or extracted from the file (e.g., at upload time as previously described), may be displayed so as to enable a user to determine which, if any, of the files or data sets meet their needs. In the illustrated example, such metadata includes file name 608, file size 610, price 612, survey date 614 and source 616 (e.g., identity of the data provider). To aid in visually correlating the list of results with the associated visually represented extent on the map, upon selection of either the visually represented extent or the item in the list of results, the associated information is visually accentuated. To the extent the authorized user has rights/permissions to do so, the selected file(s) may be downloaded, in some embodiments after payment is made and processed according to various techniques known to those in the art. Selection(s) may be downloaded directly to the device upon which the selection was made, or in the alternative, queued for later downloading (for example, if multiple selections are to be made, such selections may be batched to download upon the end of a given session). In some embodiments, selections may be saved into a watchlist 618, but not immediately downloaded. The watchlist may be shared between users, and in some embodiments may attach to the authenticated user and be saved for manipulation in future user sessions. In some embodiments, the download requests are submitted directly to the data storage system, e.g., the data storage system 204 described in connection with FIG. 2. In some embodiments, download requests through the UI may be serviced by initiating asynchronous tasks for one or more components of the data management system to retrieve and/or cache the selected data from, e.g., the data storage system. Upon at least partial completion of the tasks, the requesting user may be notified that some or all of their data is ready to be retrieved from the data management system, at which point the user may authenticate and download the cached data from the data management system itself. Such techniques may be advantageous when the data storage system is, e.g., an archival or "cold" storage system. In embodiments where the download request(s) involve data from a plurality of sources (e.g., disparate data storage systems), the data management system may, either synchronously or asynchronously, sequentially or in parallel, retrieve and/or cache the data from each of the plurality of sources, and thereon provide the cached data to the user, either as a concatenated (e.g., batched) download, as multiple discrete files, or in any other appropriate manner. For example, a data set may contain individual files from multiple sources; if the download request is for such a data set, the techniques just described may be advantageously convenient to the requesting user.

Figure 7:
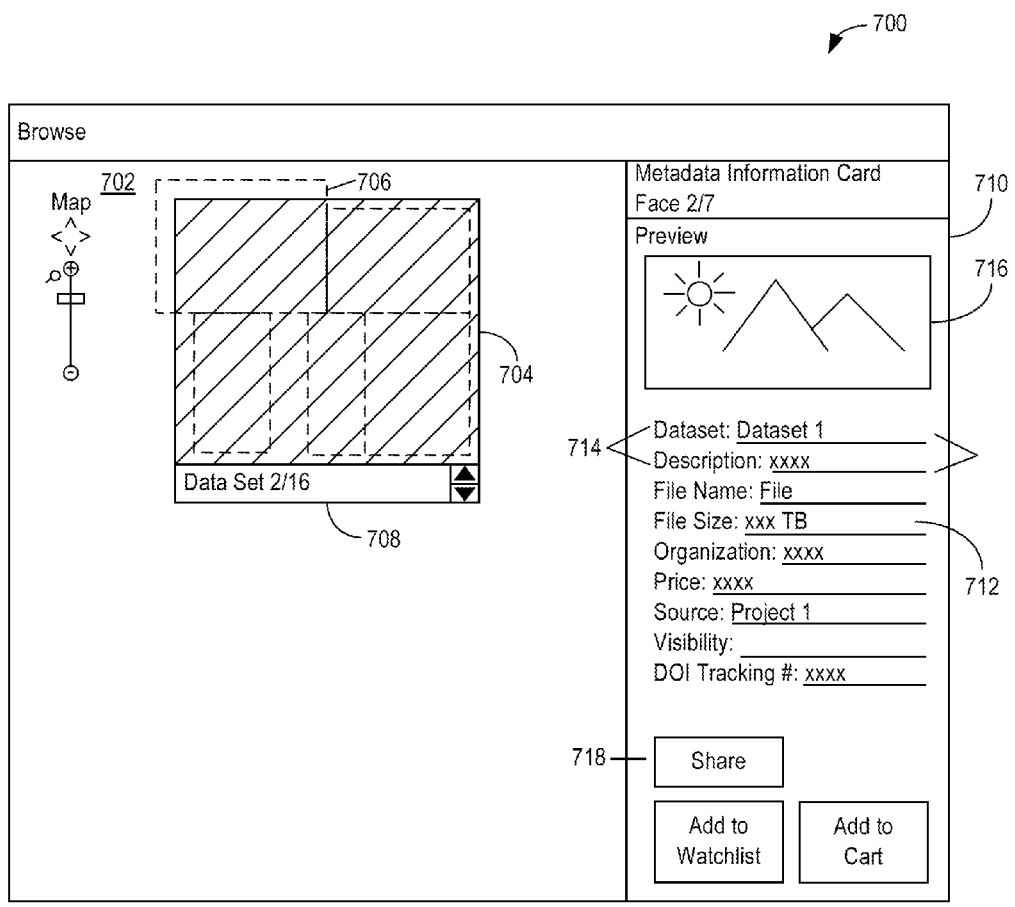
FIG. 7 shows an illustrative example of a UI for displaying metadata associated with data in accordance with at least one embodiment.

FIG. 7 illustrates an exemplary visual targeted browsing UI 700 for viewing information, such as metadata information, associated with, e.g., geospatial data files. In the illustrated embodiment, a map view 702 is presented with a switchable "target mode." When the target mode is selected, visual representations of the geospatial extents associated with geospatial data files within a predefined (or, alternatively, user-selected) area 704 are shown. To the extent that any given represented extent expands beyond the predefined or user-selected area, the portion of the represented extent outside of the area 706 is visually deemphasized so as to concentrate user focus on the predefined or user-defined area. In some embodiments, there may be multiple layers of data with overlapping extents, and some of such data may be associated with a data set (e.g., covering a given geographic area) 708. The layers may be organized such that differing layers emphasize specific features, information, and the like, or in some embodiments, may simply be a logical arrangement without any specific differentiator. For example, in embodiments where layers are differentiated by information at focus, one layer may contain detailed depth data, while another layer may concentrate on mean sea surface temperature. In such embodiments, the data sets may themselves be arranged into layers. As may be contemplated, such layered representation may provide a considerably more nuanced view of a given geographic area, and in embodiments where the layered information is interrelated, more detailed and/or sophisticated data may be derived therefrom. Layers may be selected using one or more features of the UI as illustrated.

When a specific represented extent is selected, in some embodiments, a metadata information "card" associated with the underlying data is displayed. In some embodiments, the metadata information card contains detailed metadata (e.g., geospatial or other metadata) 712 associated with the selected file. The metadata displayed may be context-sensitive to the nature and content of the file to which it is associated. The metadata displayed may also be sensitive to the context in which it is displayed, and may differ in appearance and/or content based on the rights/permissions of the authorized user, the data provider's preference, and/or other considerations. The metadata displayed at one given time may be a subset of the available and/or relevant metadata of the related context, and in some embodiments, a user may choose which of the different subsets of the available and/or relevant metadata is displayed at any given time. Such viewing flexibility may be implemented in conjunction with the ability to view different levels of metadata within the metadata hierarchy described herein. For example, the metadata information card may have multiple "faces" 714 or displayed subsets of metadata for the relevant and/or selected data file, as well as one or more "faces" for any data set(s) to which the relevant and/or selected data file belongs. In some embodiments, if multiple files are simultaneously selected (or the visually represented extents associated with such files is selected), but such files do not belong to a data set, metadata relevant to the amalgamated selection may be displayed (and in some embodiments, dynamically generated by the data management system).

The metadata information card (or representation thereof) may, in some embodiments, include functionality whereby its content is directly manipulable by third parties to the entity implementing the data management system. For example, in embodiments where data providers do not provide or otherwise generate the metadata information card itself, such data providers may provide various additional content 716 to be displayed through the metadata information card in conjunction with the metadata representing their data. The additional content may be provided in any appropriate manner, such as through an API, UI, integration with third party proprietary platforms and/or applications, or the like. Such additional content may include any content relevant to the data or data set(s) being represented, such as visual previews of the data (e.g., video files, images, three dimensional models), various forms of data analytics (such as information regarding the data's relationships to other data, or other out-of-context but relevant information relating to the data), and the like. The additional content may, in some embodiments, be integrated with existing views or "faces" as described above, and/or be displayed as additional views or "faces" within the metadata information card. The appearance and/or omission of the additional content may be dynamically regulated by the inclusion or exclusion of the additional content by, e.g., the data provider, by the permissions and/or rights of the user viewing the additional content and/or the metadata information card, the context in which the metadata information card is displayed, and so on.

The metadata information card, or a representation thereof, may be portable in the sense that a representation of the card can be shared 718, e.g., by email, web link and/or social media networks. In some embodiments, the card may be shared via an API of the system, or in some cases, through an API of an external system. Such API-based sharing may be entwined. For example, an external social media network may import the card via an API of the data management system, and itself may have an API through which data resident on its own platform is thereon generally shared. When the representation of the card is shared, the underlying data itself is, in a conceptual sense, also shared—the metadata displayed therewith provides users with sufficient information to understand the scope and content of the represented data. When displayed within the data management system's ecosystem, the metadata information card, in exemplary embodiments, always shows "live" metadata information reflecting the state of the underlying data. When the metadata information card is shared, for example by email to a recipient outside of the data management system described, a static or dynamic representation of the card may be provided rather than a discrete file containing the card's information. Such a static or dynamic representation of the card may, in some embodiments, have some or all of the functionality of the associated card as displayed within the generated ecosystem (e.g., the data management system or associated UI).

Figure 8:
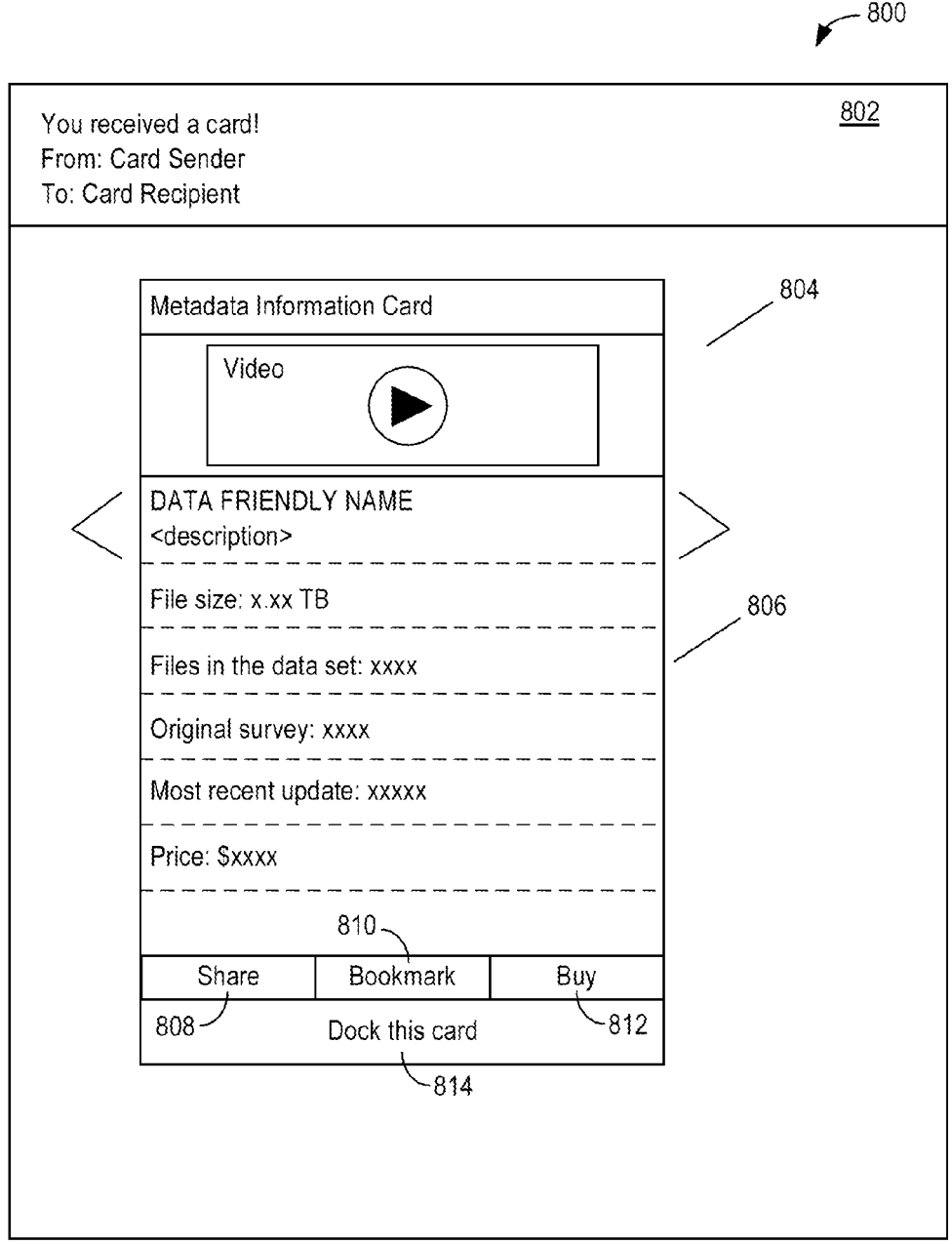
FIG. 8 shows an illustrative example of a UI visually representing metadata and other attributes associated with data in accordance with at least one embodiment.

FIG. 8 illustrates an example of an electronic metadata information card 800 as it may appear outside of an ecosystem related to the data management system from whence it derives. It is contemplated that in various embodiments, the metadata information card may take any appropriate form, including electronic, physical and/or conceptual forms, and may be static, dynamic, partially static, or partially dynamic in nature and content. In some embodiments, interactions with a static or dynamic representation of the card outside of the generating ecosystem may thereon interact with the associated aspects of the ecosystem in a similar or equivalent fashion as would the equivalent interactions with the card within the ecosystem. For example, a static or dynamic representation of the card may be implemented as a software application (such as a smartphone or tablet app or interactive HTML5 or similar web content). Upon receiving an email 802 from a current user of the data management system (such as a data provider employee or public user, e.g., customer of the data provider) as exemplarily generated by sharing functionality such as that described above in connection with FIG. 7, the illustrated example may represent an appearance 804 of the represented metadata information card upon receipt (e.g., in an email, a social media network post, or the like). As may be realized, the electronic metadata information card 800 displays different metadata information than the displayed metadata in the illustrated example 700 of FIG. 7. Such differences may, as previously described, be attuned to the context in which the metadata information is to be displayed, as well as the target audience (e.g., user type or disposition). The metadata fields 806 shown in the electronic metadata information card 800 may reflect a snapshot of the metadata information for the associated data at the time the card was shared, or, in some embodiments, may reflect the current, "live" state of the stored data. In the illustrated embodiment, the metadata information card provides functionality to the recipient to further share the card 808 with yet other users, bookmark the data 810 represented by the card (which may, in some embodiments, be similar to adding the data to the watchlist as previously described), or to purchase 812 the underlying data. Alternatively, the recipient may choose to "dock" the card 814, which, e.g., opens a web browser to display a live version of the card as provided by the front-end interface of the data management system previously described. In some embodiments where the stored data has been updated or otherwise altered at a time after the card was initially shared, additional information regarding the nature and content of the updates or alterations may be presented to the user, for example, at the time of "docking," at the time the user views the shared card (in examples where the represented card reflects the current, "live" state of the stored data), or at any appropriate time and in any appropriate fashion for the circumstances. In some embodiments, the nature and content of the update of the alterations are shown as additional metadata within, or in connection with, the card. In some embodiments, the recipient may be alerted (e.g., via email, text message, or the like), synchronously or asynchronously, that the stored data associated with the card has been altered or updated (and in some embodiments, the nature of those alterations and/or changes). In some embodiments, the data management system may track the nature and/or content of changes to the stored data (including changes in associations to data sets) over time, and such versioning capabilities may either be integrated with or independent of any functionality described herein.

In embodiments where user authentication is required to access the stored data and/or the data management system generally, it may be contemplated that wide dissemination, e.g., via social media networks, may not be compatible. However, in such embodiments, the card may be configured such that when the recipient "docks" the card, the link is set up such that it allows the recipient to access the data management system to view and/or manipulate the specific data item associated with the card. In some of such embodiments, any further actions associated with the specific data item (and, as may be contemplated, other data items), may require the recipient to obtain authorization to access the data management system (e.g., by directing the recipient of the card to an account creation page of the front-end interface).

In some embodiments, the act of sharing the card may provide the data management system with additional information regarding the putative recipient of the card. In an exemplary embodiment, a registered and authorized user of the data management system (e.g., a public user 222) may, as part of the process by which s/he shares the card, specify certain information about the recipient, such as the recipient's email address, name, company and the like. Optionally, the authorized user may specify to prepay some or all of the costs associated with the recipient's use, download and access to the data associated with the shared card. In such embodiments, the system may, for example, encode the "dock" function (in some cases, an encoded URL) to notify the system that the recipient has already had some of his/her information specified on his behalf. In some embodiments, the data management system may use information encoded in the "dock" function to notify the card's sender that the recipient has received and/or docked the card. Upon "docking" and viewing the card on the front-end interface of the data management system, any further action requiring the recipient to create an account or otherwise authorize him/herself with the data management system is facilitated by the information and/or options entered by the registered and authorized during the process of sharing the card with the recipient. For example, the account creation page may have the recipient's name and email address already entered, and any payment owed for the download may show as reduced, prepaid or negated.

The data management system, and in some embodiments specifically components of the front-end interface, may track sharing and user creation activity similar to described immediately above. By doing so, in some embodiments, the system may develop a sociogram, such as a social graph, of user interactions over time. Similarly, any information derived from the metadata (i.e., metadata-derived metadata) may be used for tracking (e.g., data provenance tracking), analysis and/or marketing purposes. In some embodiments, such information may be used to facilitate and/or target the marketing of services related to a given user. Other information, such as geographic proximity of data providers' or users' respective data holdings and/or purchases, may also be used to deduce and/or improve the relevance of services and/or products marketed toward the user. Some metadata information, such as DOI, is associated with additional, external tracking mechanisms, and such external mechanisms may be integrated with the tracking mechanisms described herein.

The metadata engine 212, or some other component within the data management system, may infer metadata from other metadata or metadata-derived metadata existing with the system. In some embodiments, the data management system may provide a suggestion to, e.g., a data provider, as to an appropriate population of one or more metadata types. In an exemplary embodiment, the system may suggest a price of a given data file or data set based on other metadata information stored within the system, such as tracked sales history, the prices of similar data, and the like. Such suggestions may be conveyed through any appropriate facility of the system, such as through the upload UI, when displaying metadata in an edit mode of a UI, or through the described metadata information card.

In some embodiments, derivative information (metrics) related to the metadata information card (or representation thereof) itself may be derived and/or generated by a relevant aspect of the data management system (e.g., the front-end interface or metadata engine), and may be tracked, stored and/or displayed by the data management system. For example, an aspect of the data management system may use DOI and/or similar standards to compute statistics about the metadata information card and its associated source data or data sets. Examples of such statistics may include the number of views of the metadata information card, the number of times the metadata information card is marked by users for tracking (e.g., appearance on user "watch lists"), the number, locale, etc. of downloads of (or requests for) the card, and the like. Such tracked information may be displayed upon the card itself (e.g., as a separate "face" or inline with other content on the card). Additionally, the data management system may track, store and/or display derivative information (metrics) related to the data providers, end-users (or other users) of the data management system, and/or accounts created upon the data management system. Such information may be generated to, for example, determine the reliability, accuracy, level of activity, or authority of a given data provider, user or account on the data management system, and the generated information may be displayed in any appropriate context, including in conjunction with associated metadata information card(s), within interactions or transactions involving such users or accounts, and the like. Such display of derivative information (e.g., feedback) may, in some embodiments, be intended to incentivize data providers, users or accounts to increase or optimize their profile (e.g., the quality of the data, the participation rate of a user, and the like). In some embodiments, data providers, users and/or accounts may view derivative information related thereto in the aggregate (e.g., information about the activity of a given metadata information card) to view and/or ascertain trends in the metrics, as well as share some or all of the derivative information/metrics with others. In some embodiments, a notification may be provided (e.g., to the requesting data provider, user and/or account, or to others) when any derivative information or metric crosses a user-defined or predetermined threshold. For example, a data provider may set a notification to be delivered to the public when a metadata information card derived from their data holdings exceeds a given number of views. Such a notification may, for example, further increase public visibility or interest in the data provider's data holdings.

Figure 9:
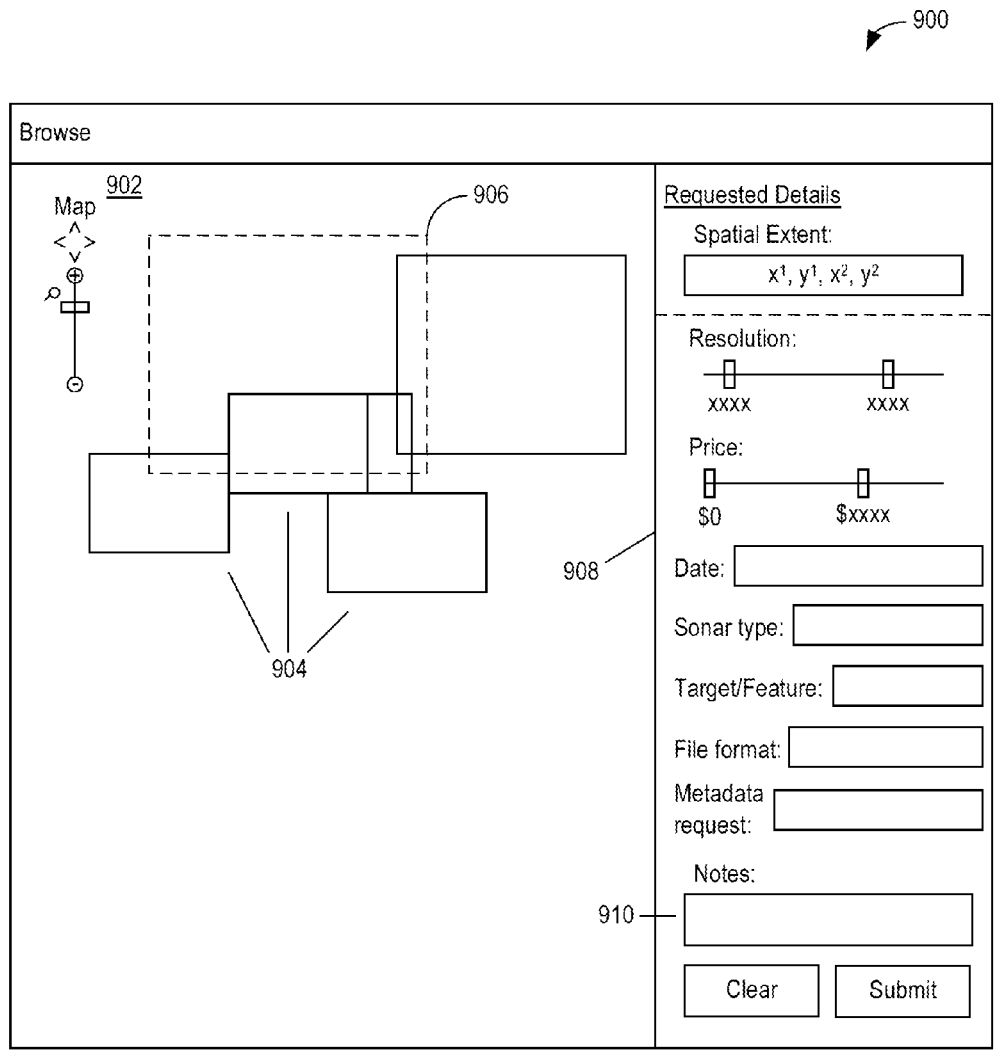
FIG. 9 shows an illustrative example of a UI for submitting requests for geospatial data using associated metadata as parameters in accordance with at least one embodiment.

FIG. 9 illustrates an exemplary data request UI 900. In some embodiments, the data request UI allows a user to specify a region on a map 902 for which the user may request additional data. In the illustrated example, visually represented extents 904 of the stored data may be shown on the map. A requesting user may define a region upon a map, by, for example, drawing a bounding box 906, for which the user wishes to attain geospatial data. Additionally, the user may define certain parameters for the data 908, such as exact spatial extent, resolution range, desired price, sonar type, survey area, survey date, specific target or feature, file format and the like. The user may also specify comments about their request 910. In some embodiments, upon submission, any data already existing is represented to the user in a manner similar to that previously described. In some embodiments, upon submission, a record of the request is stored, e.g., associated with a given user in a database such as the user catalog 208, and details of the request are submitted to an administrator of the data management system or external system for manual fulfillment and disposition. In some embodiments, tracked data associated with the data providers, such as information regarding surveyors and/or vendors known to have generated data within the user-specified geospatial region (or those who are known to possess and desire to sell such data), may be used to direct the request to entities that are best able to fulfill the request. In some embodiments, if a plurality of users request data in a similar geospatial area for which data may not exist, such information may be used to, for example, commission one or more data providers to develop geospatial data related thereto. As may be contemplated, any combination of information tracked, developed, collected, and/or derived as described herein, may be used to facilitate such a request for data.

FIG. 10 illustrates an example process 1000 for modeling data based on associated metadata. Some or all of the process 1000 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory. It is contemplated that the steps of process 1000, as with any and all processes described herein, are not necessarily interdependent or performed in a particular order, except as explicitly stated.

Data, such as geospatial data, in raw and/or preprocessed format is received from a data provider 1002. The data provider may, for example, be similar to data provider 216 as described at least in connection with FIG. 2. Such data may be ingested by a component of data management system 102 as described in connection with at least FIGS. 1 and 2, and may be ingested using data ingestor 210, also as described in connection with at least FIG. 2. Associated metadata is extracted from the data or an accompanying metadata information file 1004, using, for example a metadata engine 212 and using various techniques described herein. The received data is stored in a distributed data store 1006, such as the data storage system 204 or other externalized computing resource of a distributed computing system 104, 202, using one or more techniques previously described. The extracted metadata is stored in a metadata catalog 1008, which in some embodiments may be similar to the metadata catalog 206 discussed in connection with at least FIG. 2.

FIG. 11 illustrates an example process 1100 for updating stored raw data with processed data. Available data holdings are presented to a user or data provider as a function of their associated metadata 1102. For example, the data may be listed in a UI of the front-end interface 214 described in connection with at least FIG. 2 through 4. A selection of one or more files among the data holdings is selected for download 1104, using techniques similar to those discussed at least in connection with FIGS. 2 and 4 (including by way of a local application 220). Upon receipt of selection, the data files are provided to the requesting user 1106 using one or more techniques discussed herein. Replacement or augmentative data files, such as raw files processed into a standard format, are received from the customer 1108, whereupon metadata for the received files is updated 1110. As may be contemplated, in some embodiments, the updated files and associated metadata may replace the originally uploaded data and extracted metadata so as not to create duplicate entries. Upon completion of any such processing tasks for a given set of data, a data provider or similar entity may authorize one or more clients to access the data 1112. As previously discussed, such clients may include public users 108, 222, and the creation of associated user accounts may include various techniques discussed herein, such as those described in connection with at least FIG. 2.

Figures 12, 13:
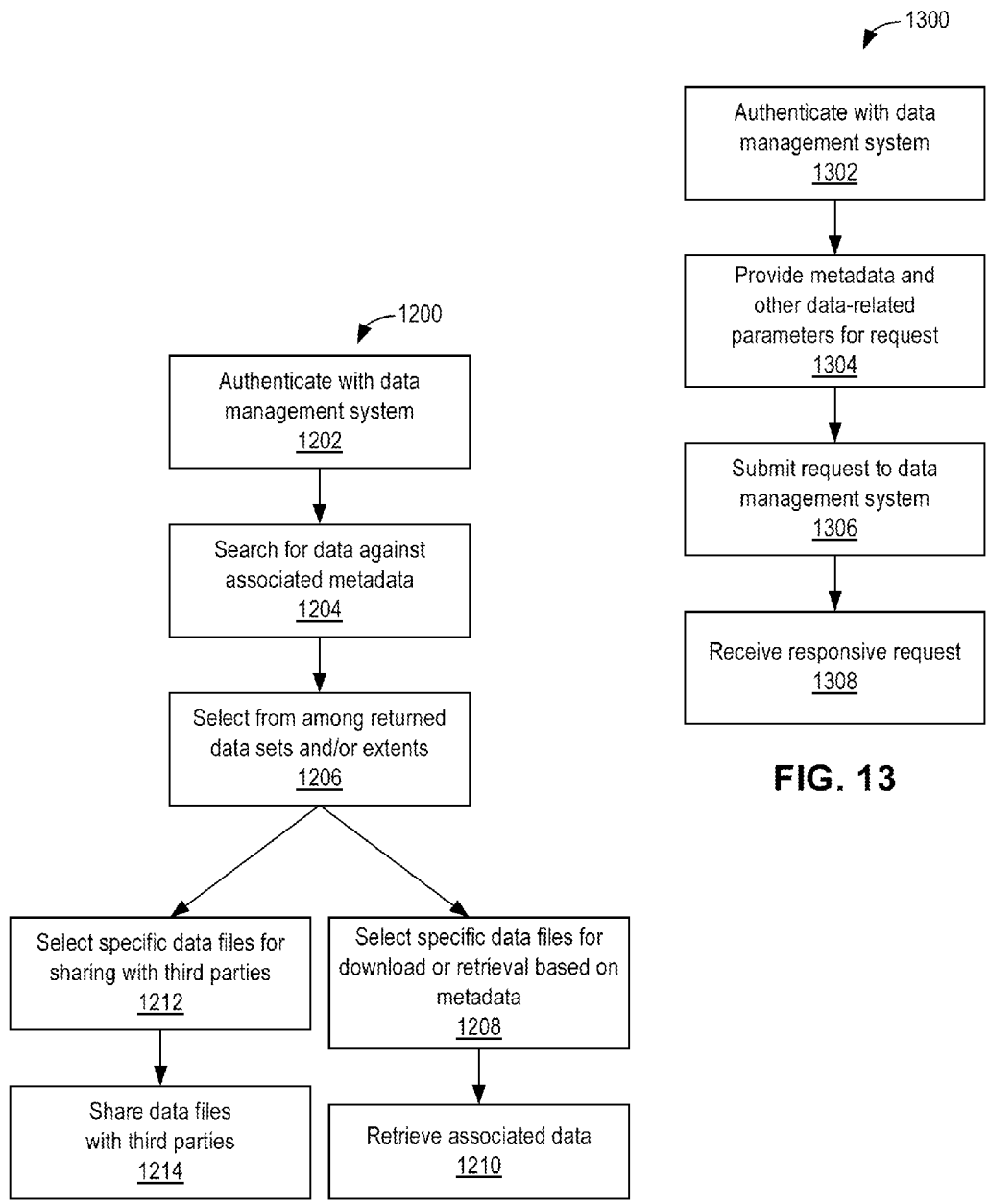
FIG. 12 shows an illustrative example of a process for manipulating data via associated metadata in accordance with at least one embodiment.
FIG. 13 shows an illustrative example of a process for requesting data based on exposed metadata in accordance with at least one embodiment.

FIG. 12 illustrates an example process 1200 for viewing, sharing and/or selecting data based on associated metadata. A user authenticates with the data management system 1202, in some embodiments through a front-end interface 214 of the data management system 102, 200. Such a user may be created by, e.g., a data provider as part of the process 1100, on the user's own initiative (e.g., through a UI enabling the self-service creation of user accounts), or through sharing of data and/or metadata, as previously described in connection with at least FIGS. 7 and 8. The authenticated user performs a search query for data using associated metadata information 1204, using one or more of the techniques described throughout this disclosure, including in connection with at least FIG. 5. The authenticated user then selects from among the data sets and/or extents returned by the search query 1206, in some embodiments visually represented as areas on a map using at least techniques described in connection with FIG. 6. The user may then select from among the data files or data sets for download or retrieval based on metadata information provided for the data files or data sets 1208, in a fashion similar to that described in connection with at least FIGS. 6 and 7, and thereon retrieves the selected data files 1210 using various techniques, also described in connection with at least FIGS. 6 and 7. In the alternative, specific data files may be selected from the returned data sets and/or extents in step 1206 for sharing, by way of metadata representation, with third parties 1212. The metadata representation may include the electronic metadata information card or similar construct described in connection with at least FIGS. 7 and 8, and may be disseminated using at least the techniques described in connection with the same. The third party is provided with the metadata representation 1214, which contains one or more features described at least in connection with FIGS. 7 and 8, and may retrieve the associated data 1210 by way of at least the techniques described in connection with FIG. 8.

FIG. 13 illustrates an example process 1300 for requesting data from data providers via a data management system. A user authenticates with the data management system 1302 in a fashion similar to that alluded to in connection with process 1200. The user defines various data and metadata-related parameters for their request 1304, including geospatial region, in accordance with various techniques described in connection with at least FIG. 9. The defined data and metadata-related parameters are submitted as a request for data to the data management provider 1306, whereupon the request is serviced according to at least the techniques and features described in connection with FIG. 9. If applicable, and optionally, the user may receive data responsive to the request from the data management system 1308.

The various techniques described herein may be partially or fully implemented using code that is storable upon storage media and computer readable media, and executable by one or more processors of a computer system. Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A computer-implemented method for disseminating data, comprising:
   under the control of one or more computer systems configured with executable instructions,
   detecting one or more relevant metadata types for a first set of one or more data files of a data provider;
   extracting metadata of the detected relevant metadata types from the first set, the metadata including at least:
      information that identifies the one or more data files of the first set from which the metadata is extracted; and
      information describing one or more relationships between the first set and at least a second set of one or more data files of the data provider, the one or more relationships based on at least one shared characteristic between the first set and the second set;
   associating the extracted metadata with at least the first set and the data provider;
   at a time after receiving a browse request from a user to view the first set, determining, based on the browse request and the associated metadata, a subset of the associated metadata that identifies at least the first set, the data provider, and the at least one shared characteristic;
   responding to the browse request by displaying at least the determined subset of the associated metadata; and
   at a time after receiving a download request from a user to acquire at least some of the data files of the first set, responding to the request by causing the requested data files of the first set to be transferred from the data provider to the user.

2. The method of claim 1, further comprising:
   receiving a data set creation request from a data provider to associate one or more of the data files into the first set; and
   generating the first set based on the data set creation request.

3. The method of claim 2, wherein extracting the metadata from the first set includes extracting metadata relevant to any data set in which the data files of the first set are associated.

4. The method of claim 1, further comprising:
   generating metrics related to at least the browse request and the download request; and
   tracking the generated metrics so as to enable the data provider to determine a level of interest in the data files.

5. The method of claim 4, further comprising displaying the generated metrics in connection with the displayed subset of associated metadata.

6. The method of claim 1, wherein the data provider is separate from the one or more computer systems.

7. The method of claim 1, further comprising displaying, in connection with the displayed subset of associated metadata, additional content related to the data files and provided by the data provider.

8. A computer-implemented method for disseminating data, comprising:
   under the control of one or more computer systems configured with executable instructions,
      processing a first set of data of a data provider so as to:
         determine, based on contents of at least some of the data of the first set, at least one type of relevant metadata element to be generated for the first set; and
         generate a plurality of metadata elements of the determined types related to the processed first set of data, the metadata elements including at least information identifying at least one association between content of the first set and content of a second set of data of the data provider, the association based on a shared context between the content of the first set and the content of the second set;
      at a time after receiving a request for information from a requestor regarding a subset of the processed first set of data, determining, based on the received request for information and the plurality of metadata elements, at least a subset of the generated metadata elements that identifies contents of at least some of the subset of the processed data by including at least the information identifying the at least one association;
      providing, in connection with the subset of the processed first set of data, the determined subset of the metadata elements via the one or more computer systems; and
      at a time after receiving a request for the subset of the processed first set of data from the requestor, facilitating transfer of the subset of the processed first set of data to the requestor.

9. The method of claim 8, wherein the subset of metadata elements is provided through an API.

10. The method of claim 8, wherein the subset of metadata elements is provided through a user interface.

11. The method of claim 10, wherein the provided subset of metadata elements is displayed in the form of an electronic metadata information card.

12. The method of claim 11, wherein the electronic metadata information card is capable of displaying the metadata elements related to the subset of processed data by displaying a subset of the metadata elements at a given time.

13. The method of claim 11, further comprising:
   generating a representation of the electronic metadata information card; and
   at a time after receiving a sharing request, providing the representation to a recipient identified in connection with the sharing request.

14. The method of claim 13, further comprising upon receiving a download request from the recipient, facilitating transfer of the subset of processed data to the recipient.

15. The method of claim 13, wherein the representation contains a subset of functionality of the electronic metadata information card.

16. A data management system, comprising:
   one or more processors; and
   memory, including instructions executable by the one or more processors to cause the data management system to at least:
      ingest data files from a data provider;
      determine, based on at least a subset of content of at least a subset of the ingested data files, one or more relevant types of metadata to generate;
      process the ingested data files to generate metadata sets of the determined relevant types, each metadata set related to a subset of the ingested data files and including at least information identifying at least one shared context between content of a first set of the ingested data files and content of a second set of the ingested data files;
      interface with customers of the data provider by at least:
         in response to customer requests, dynamically configuring the generated metadata sets to identify the related subsets of ingested data files using the at least one shared context; and
         providing the dynamically configured generated metadata sets to the customers in connection with the customer requests; and initiate one or more transactions between the customers and the data provider in connection with the customer requests.

17. The system of claim 16, wherein the data provider is physically separate from the data management system.

18. The system of claim 16, wherein the data management system is integrated with the data provider.

19. The system of claim 16, wherein the instructions are executable to cause the data management system to further:
ingest metadata from the data provider; and
at a time after a request from the data provider, update one or more of the generated metadata sets using at least a subset of the ingested metadata.

20. The system of claim 16, wherein the initiated transactions include customer requests for the data provider to provide data files other than the ingested data files.

21. The system of claim 16, wherein the data files contain geospatial data, and wherein each generated metadata set contains metadata relevant to the specific type of geospatial data file ingested.

22. The system of claim 16, wherein the instructions are executable to cause the data management system to further:
determine whether the ingested data files are in a standards-compliant file format; and
at a time after determining that one or more of the ingested data files is in the standards-compliant file format, process the standards-compliant data file so as to include at least metadata required for the standard to which the standards-compliant data file complies.

23. The system of claim 16, wherein the instructions are executable to cause the data management system to further generate metadata sets relevant to data sets defined by the data provider, the data sets comprising one or more ingested data files.

24. One or more non-transitory computer-readable storage media having collectively stored thereon executable instructions that, when executed by one or more processors of a computing resource provider's computer system, cause the computer system to at least:
at a time after receiving data from a data source,
determine, based on at least a subset of content of at least a subset of the received data, one or more relevant metadata types to use in a model of the received data;
generate the model of the received data using at least metadata of the determined relevant metadata types associated with the received data, the model configured to identify at least a subset of the received data and to identify contextual relationships between the subset of the received data and at least a second subset of the received data;
provide an interface whereby a first user associated with the data source may associate extrinsic content with the received data;
provide, to at least a second user, a representation of the received data such that the representation identifies the subset of the received data and the contextual relationships, the representation further comprising the model of the received data and the associated extrinsic content; and
upon receiving a request from the second user to transfer the modeled data, facilitating the transfer of the modeled data from the data source to the second user.

25. The computer-readable storage media of claim 24, wherein the interface is a programmatic interface.

26. The computer-readable storage media of claim 24, wherein the interface is a user interface.

27. The computer-readable storage media of claim 24, wherein the extrinsic content includes analytics generated by an entity under control of the data source, the analytics being related to the received data.

28. The computer-readable storage media of claim 24, wherein the extrinsic content includes one or more elements that enable the second user to interact with the extrinsic content.

29. The computer-readable storage media of claim 24, wherein the representation is provided as an electronically displayed, interactive metadata information card.

30. The computer-readable storage media of claim 29, wherein the metadata information card is capable of simultaneously displaying the metadata and the extrinsic content.

* * * * *